United States Patent [19]

Amatucci et al.

[11] Patent Number: 5,674,645

[45] Date of Patent: Oct. 7, 1997

[54] LITHIUM MANGANESE OXY-FLUORIDES FOR LI-ION RECHARGEABLE BATTERY ELECTRODES

[75] Inventors: Glenn G. Amatucci, Raritan; Jean-Marie Tarascon, Martinsville, both of N.J.

[73] Assignee: Bell Communications Research, Inc., Morristown, N.J.

[21] Appl. No.: 706,546

[22] Filed: Sep. 6, 1996

[51] Int. Cl.[6] .............................. H01M 4/50; C01G 45/12
[52] U.S. Cl. ...................... 429/224; 423/464; 423/599
[58] Field of Search ............................ 429/224, 218, 429/221, 223; 423/464, 465, 596, 599

[56] References Cited

U.S. PATENT DOCUMENTS

| | | | |
|---|---|---|---|
| 3,779,948 | 12/1973 | Loriers et al. | 423/464 X |
| 5,296,318 | 3/1994 | Gozdz et al. | 429/192 |
| 5,370,949 | 12/1994 | Davidson et al. | 429/224 |
| 5,425,932 | 6/1995 | Tarascon | 423/599 |
| 5,460,904 | 10/1995 | Gozdz et al. | 429/192 |
| 5,514,496 | 5/1996 | Mishima et al. | 429/218 |

FOREIGN PATENT DOCUMENTS 0390185  10/1990  European Pat. Off. ......... H01M 4/48

OTHER PUBLICATIONS

Tarascon et al., "The Spinel Phase of $LiMn_2O_4$ s a Cathode in Secondary Lithium Cells", *J. Electrochem. Soc.*, vol. 138, No. 10, pp. 2859–2864, Oct. 1991.

*Primary Examiner*—Anthony Skapars
*Attorney, Agent, or Firm*—Lionel N. White; Joseph Giordano; Loria B. Yeadon

[57] ABSTRACT

The cycling stability and capacity of li-ion rechargeable batteries are improved by the use of lithium manganese oxy-fluoride electrode component intercalation materials having the general formula, $Li_{1+x}M_yMn_{2-x-y}O_{4-z}F_z$, where M is a transition metal, e.g., Co, Cr, or Fe, and $x \leq 0.4$, $y \leq 0.3$, and $0.05 \leq z \leq 1.0$.

12 Claims, 8 Drawing Sheets

LITHIUM MANGANESE OXY-FLUORIDES FOR LI-ION RECHARGEABLE BATTERY ELECTRODES

BACKGROUND OF THE INVENTION

The present invention relates to lithium manganese oxide intercalation compounds useful as active electrode materials in Li-ion rechargeable batteries and, particularly, to oxy-fluoride complexes of such compounds and their use to improve the cycling stability and capacity of such batteries.

Lithium manganese oxide intercalation compounds, nominally $LiMn_2O_4$, have been increasingly proven to be effective and economical materials for the fabrication of secondary, rechargeable Li-ion electrolytic cells and composite batteries. Successful batteries of this type are described in U.S. Pat. Nos. 5,296,318 and 5,460,904. These batteries exhibit an admirable level of electrical storage capacity and recharge cycling stability over a wide range of voltages; however, these properties have not been considered entirely satisfactory to meet the increasingly stringent requirements of modern electronic equipment and applications.

Extensive investigations have been undertaken to improve the noted properties, and such works have resulted in determinations that variations in the structural parameters of the $LiMn_2O_4$ spinel, for example, the a-axis lattice dimension of the compound, contribute significantly to ultimate cell performance. Such structural parameters have in turn been found to depend to a great extent upon the constitution of the intercalation compound and upon the conditions of its synthesis. In this respect, it has been generally agreed, for instance, that an a-axis parameter of less than 8.23 Å promotes desirable recharging stability over extended cycles.

Approaches to achieve this advantageous parameter range have included close control of synthesis conditions, such as described by Tarascon in U.S. Pat. No. 5,425,932, to gain the advantage of smaller a-axis dimensions exhibited by higher Mn valence levels; and cationic substitutions, such as noted by Tarascon et al., *J. Electrochem.* Soc., Vol. 138, No. 10, pp. 2859–2864, October 1991, or by replacement of a portion of the Mn atoms with Co, Cr, or Fe, such as suggested in European Patent 390,185. A number of other investigators have recommended an increased level of lithium insertion to obtain a similar effect from a replacement of Mn, according to the representative structural formula, $(Li)_{tet}[Mn_{2-x}Li]_{oct}O_4$, as an effective means of improving cycling stability, but this practice has been found to result in a sacrifice of cell capacity, as was observed with the earlier Mn replacement approach.

In contrast to these previously implemented expedients, the present invention utilizes anionic substitution to provide a means for achieving concurrent improvements in both cycling stability and cell capacity and enables the fabrication of batteries capable of long-lasting and high-powered operation.

SUMMARY OF THE INVENTION

We have discovered that the inadequacies of prior practices may be remedied by anionic substitution of a portion of the nominal $LiMn_2O_4$ oxygen atoms with fluorine. Although such substitutions alone were initially observed to result in expansion of the a-axis parameter beyond the preferred range, apparently due to Mn valence reduction, we found, upon further investigation, that a contemporary increase in Li substitution for Mn surprisingly achieved a dramatic shift of a-axis dimension into the optimum range below 8.23 Å. Electrolytic battery cells comprising these fluoro-substituted electrode materials thereafter exhibited remarkable cell capacity, as well as cycling stability.

Preparation of these advantageous oxy-fluoride spinel derivatives may most simply follow the usual practice, such as noted in Tarascon, U.S. Pat. No. 5,425,932, of annealing at about 800° C. stoichiometric mixtures of appropriate precursor compounds, typically $Li_2CO_3$, LiF, and $MnO_2$. These derivatives may also include precursors for cationic substitutions as earlier-noted in EP 390,185. The resulting intercalation materials that may be effectively employed to achieve an improvement in prior electrolytic cells are therefore represented in the general formula, $Li_{1+x}M_yMn_{2-x-y}O_{4-z}F_z$, where M is a transition metal, such as Co, Cr, or Fe, and $x \leq 0.4$, $y \leq 0.3$, and $0.05 \leq z \leq 1.0$.

Series of battery cell positive electrode compositions prepared with the oxy-fluoride compounds varying primarily in x and z formula components, i.e., Li and F, were examined by x-ray diffraction analysis to determine the resulting a-axis lattice parameters and were then incorporated into test cells in the usual manner, as described in the above-mentioned patents. The cells were subjected to repeated charge/discharge cycling to determine the effect of compound constitution on the level of electrical storage capacity exhibited by the cells, generally as mAhr/g of electrode compound, as well as on the cycling stability, i.e., the ability to maintain the initial level of capacity over extended cycling.

BRIEF DESCRIPTION OF THE DRAWING

The present invention will be described with reference to the accompanying drawing of which.

DESCRIPTION OF THE INVENTION $Li_{1+x}Mn_2O_4$ intercalation materials employed in prior practices (according to present formula designation, $Li_{1+x}M_yMn_{2-x-y}O_{4-z}F_z$, where y=0 and z=0) were prepared for use as performance control samples in the manner described in the aforementioned U.S. Pat. No. 5,425,932, using stoichiometric mixtures of the primary precursor compounds, for example, 9.23 parts by weight of $Li_2CO_3$ to 43.46 parts of $MnO_2$ to obtain the nominal $LiMn_2O_4$. Test cells of these control samples, as well as samples of the present invention materials to be described later, were likewise prepared and tested in galvanostatic and potentiostatic studies, generally as described in that patent specification. Such test cells comprised lithium foil negative electrodes as a practical expedient, since experience has confirmed that performance results achieved in this manner are objectively comparable to those obtained with Li-ion cell compositions described in the other above-noted patent specifications. Additional tests, as indicated below, were nonetheless conducted with Li-ion compositions comprising the present materials to obtain further confirmation of this correlation in results.

EXAMPLE 1

Figure 1:
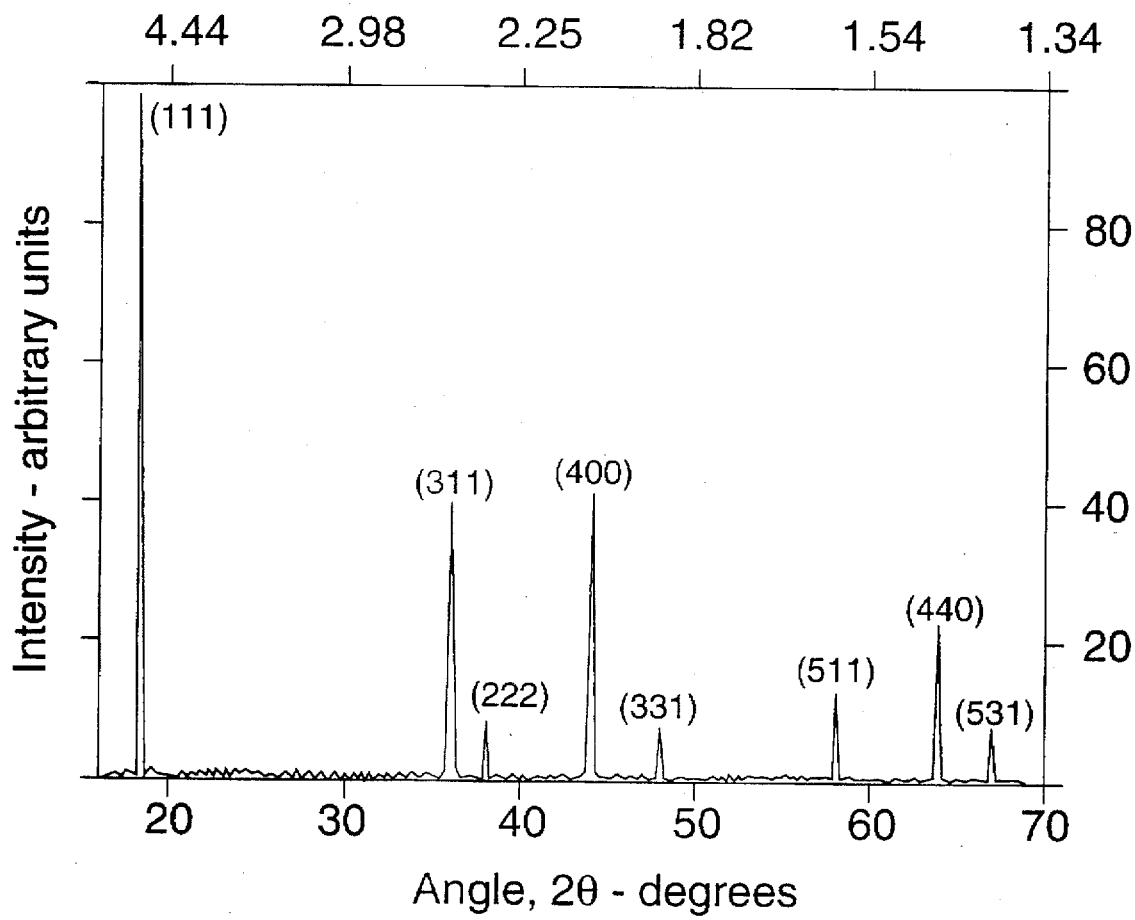
FIG. 1 is the x-ray diffraction pattern of an invention compound, $Li_{1+x}M_yMn_{2-x-y}O_{4-z}F_z$, where x=0.1, y=0, and z=0.1.

In a typical preparation of an intercalation material of the present invention, stoichiometric proportions of the precursors, $MnO_2$ (EMD-type), $Li_2CO_3$, and LiF, were thoroughly mixed in an agate mortar and pestle in a weight ratio of 60.94:12.82:1, and the mixture was annealed in air in an alumina crucible in the manner of the control samples to obtain a test composition of $Li_{1+x}M_yMn_{2-x-y}O_{4-z}F_z$, where x=0.1, y=0, and z=0.1 ($Li_{1.1}Mn_{1.9}O_{3.9}F_{0.1}$). Specifically, the mixture was heated at a regular rate over a period of about 12 hours to a temperature of 800° C. at which it was maintained for about 12 hours. The sample was then cooled to room temperature at a regular rate over a period of about 24 hours. After a mix/grinding, the sample was reheated over a period of 5 hours to 800° C. where it was held for about 12 hours before being finally cooled to room temperature over a period of about 24 hours. The resulting oxy-fluoride compound was characterized by CuKα x-ray diffraction (XRD) examination to obtain the graphic pattern shown in FIG. 1. The clearly-defined peaks of the pattern confirmed the well-crystallized, single-phase product of the synthesis.

EXAMPLE 2

Figure 2:
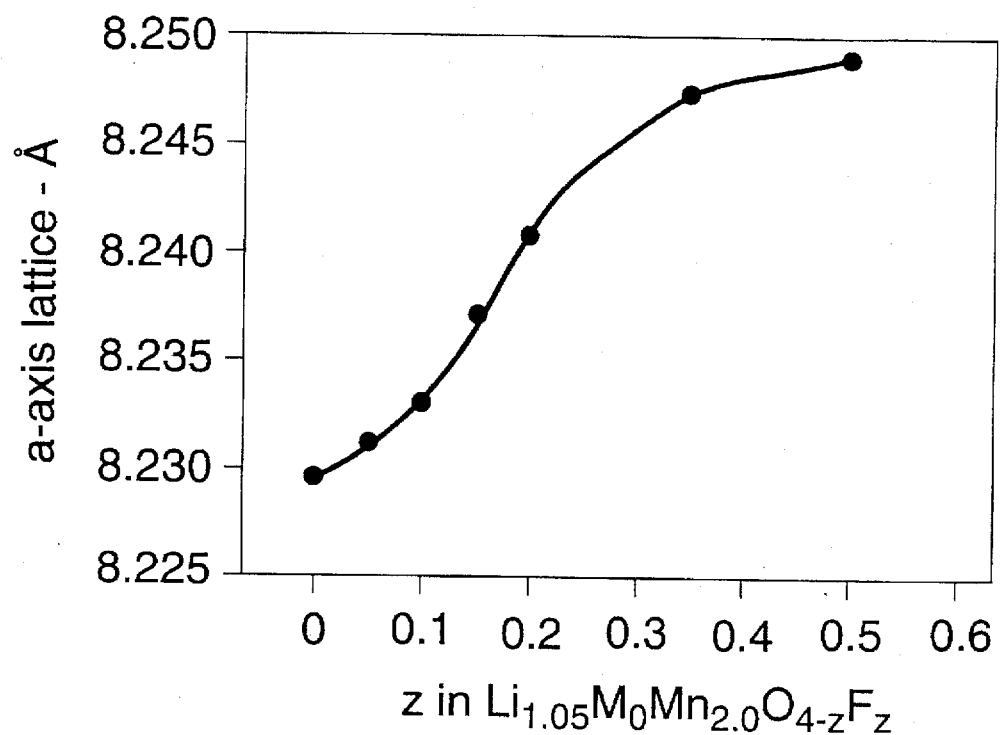
FIG. 2 is a graph of a-axis lattice dimensions v. z of invention compounds, $Li_{1+x}M_yMn_{2-x-y}O_{4-z}F_z$, where x=0.05, y=0, and $z \leq 0.5$.

A series of oxy-fluoride compounds of the present invention was similarly prepared with appropriate combinations of precursor compounds to yield $Li_{1+x}M_yMn_{2-x-y}O_{4-z}F_z$, where x=0.05, y=0, and z=0, 0.05, 0.10, 0.15, 0.20, 0.35, and 0.50. The resulting samples were characterized by XRD and the respective a-axis lattice parameters were calculated. A plot of these parameter dimensions as shown in FIG. 2 indicates the regular increase which tracks and is indicative of the increase in fluorine substitution.

Figure 3:
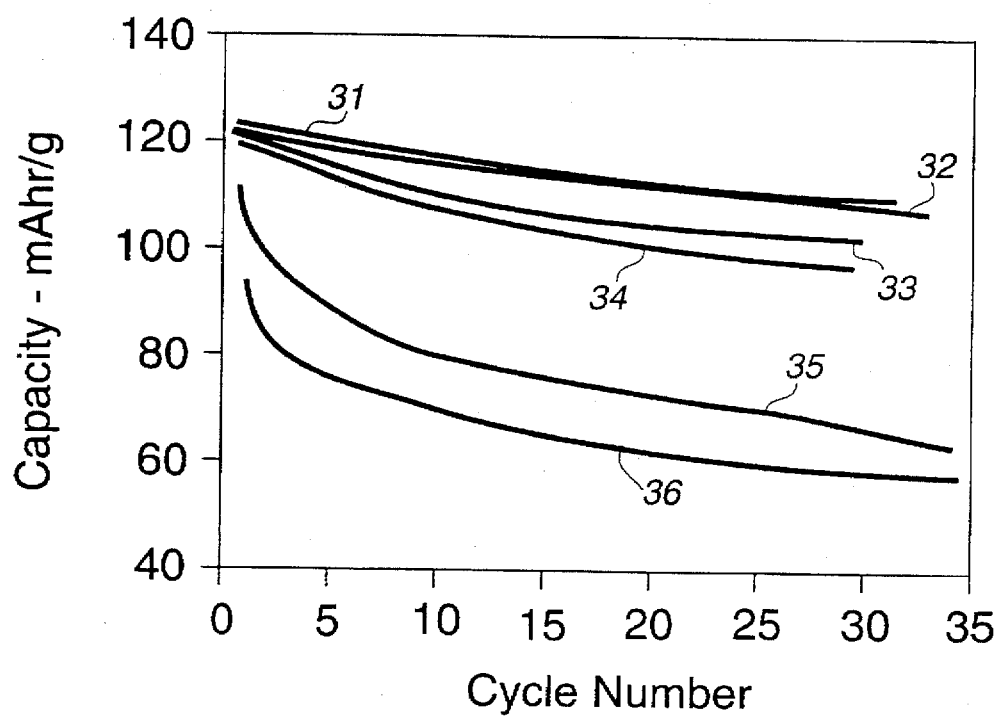
FIG. 3 is a graphic comparison of capacity and cycling stability v. number of charging cycles for battery cells comprising positive electrode compounds of FIG. 2.

Portions of the same samples were individually incorporated with about 10% conductive carbon and 5% polyvinylidene fluoride binder and formed as a layer on an aluminum foil substrate to provide positive test cell electrodes. Arranged in the usual manner with a lithium foil electrode and intervening glass fiber separator saturated with a 1M electrolyte solution of $LiPF_6$ in a 2:1 mixture of ethylene carbonate:dimethylcarbonate, the sample electrodes formed test cells which were subjected to charge/discharge cycling over the range of 3.4–4.5V at a C/5 rate (full cycle over 5 hours). The capacity of each cell was traced during a period of up to 35 cycles to provide an indication, as seen in FIG. 3, of the rate of change of that property, i.e., the cycling stability of the cell, with extended recharging. Traces 31–36 reflect the above-stated increasing levels of fluorine substitution, z, from 0.05 to 0.5. A comparison of the results depicted in FIGS. 2 and 3 graphically confirms the general tendency toward loss of both capacity and cycling stability with an increase in a-axis dimension above the preferred limit of about 8.23 Å.

EXAMPLE 3

Figure 4:
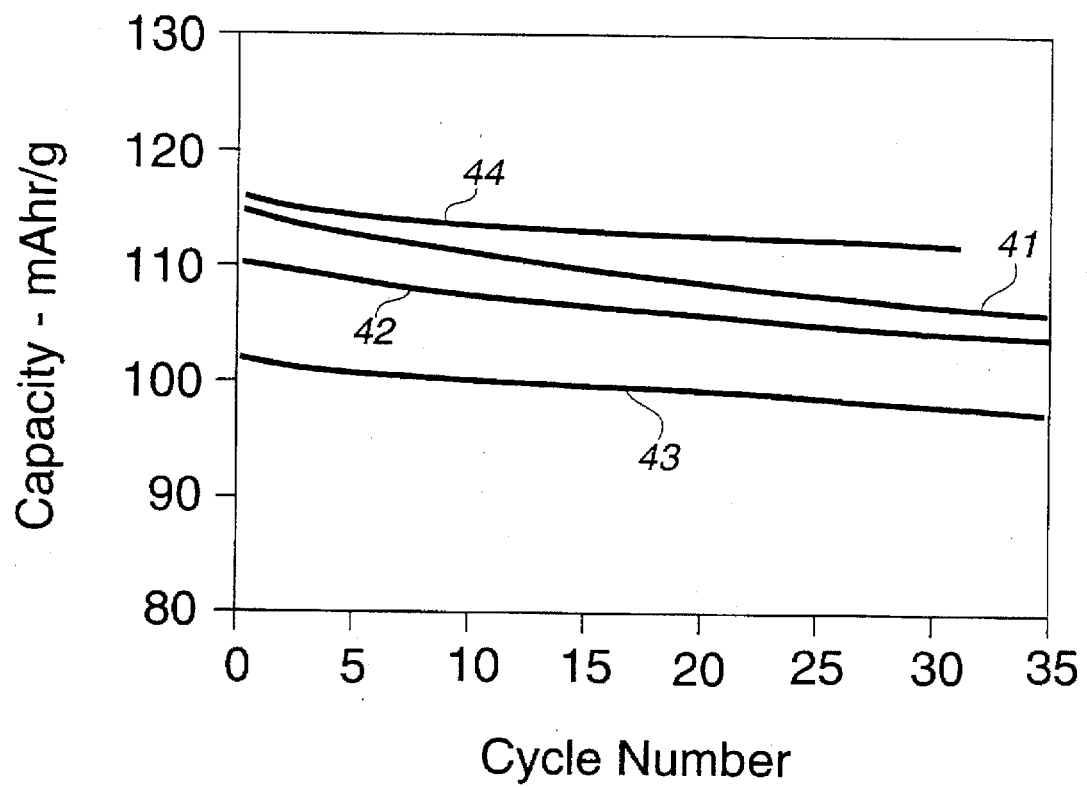
FIG. 4 is a graphic comparison of capacity and cycling stability v. number of charging cycles for cells comprising prior $Li_{1+x}Mn_2O_4$ electrode compounds and a compound of the present invention.

A series of unsubstituted intercalation compounds of the prior art varying only in Li, i.e., $Li_{1+x}M_yMn_{2-x-y}O_{4-z}F_z$, where x=0.05, 0.075, and 0.1, y=0, and z=0, was prepared and tested in similar manner to provide an indication of the effect of that variable on the capacity and cycling stability of resulting cells. As may be seen in FIG. 4 as traces 41–43 of increasing Li content, that variance alone improves cycling stability, but significantly reduces cell capacity. The performance of an additional cell prepared with the oxy-fluoride (x=0.1, z=0.1) compound of Example 1 is also represented in FIG. 4, at trace 44, and reflects the surprising effect achieved by the present invention. In particular, a comparison of traces 43 and 44 having like Li content reveals the outstanding improvement in both capacity and cycling stability resulting from this combination with fluorine substitution.

EXAMPLE 4

Figure 5:
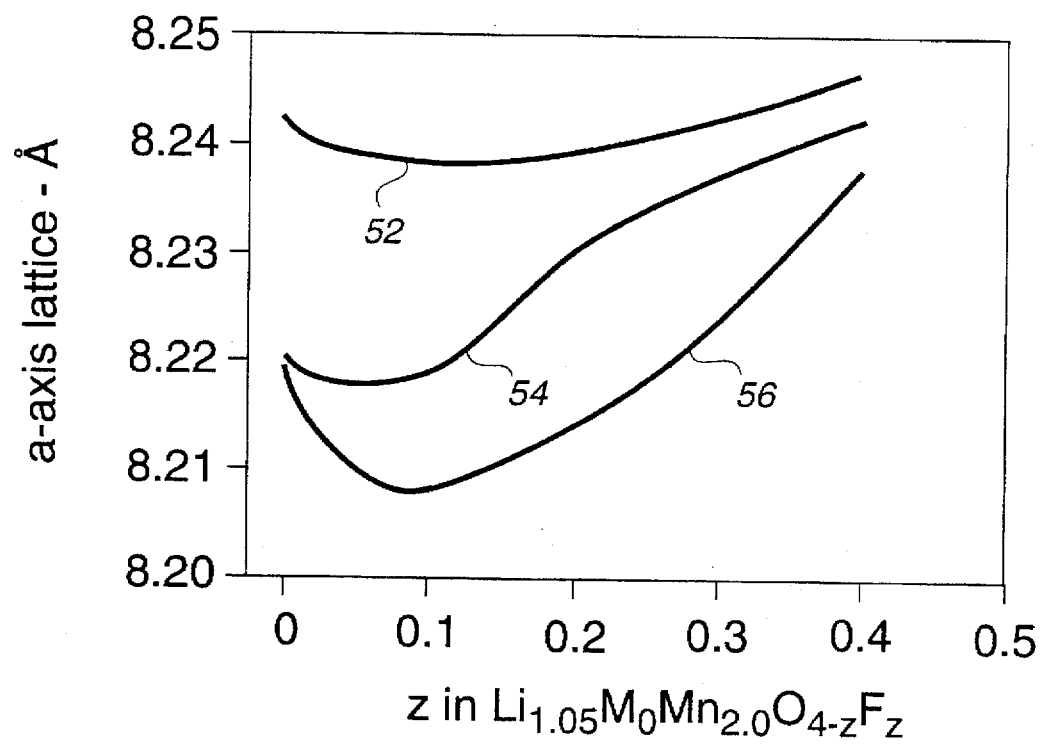
FIG. 5 is a graphic comparison of a-axis lattice dimension v. z of invention compounds, $Li_{1+x}M_yMn_{2-x-y}O_{4-z}F_z$, where $x \leq 0.2$, y=0, and $z \leq 0.4$.

Series of oxy-fluoride compounds were prepared varying in both Li and F, i.e., $Li_{1+x}M_yMn_{2-x-y}O_{4-z}F_z$, where x=0, 0.1, and 0.2, y=0, and z=0, 0.05, 0.1, 0.2, and 0.4. The variations of a-axis lattice parameter for each series are shown in FIG. 5 as traces 52–56 of increasing Li and indicate the remarkable effect of the combination of Li and F content on achieving an optimum range of this parameter.

EXAMPLE 5

Figure 6:
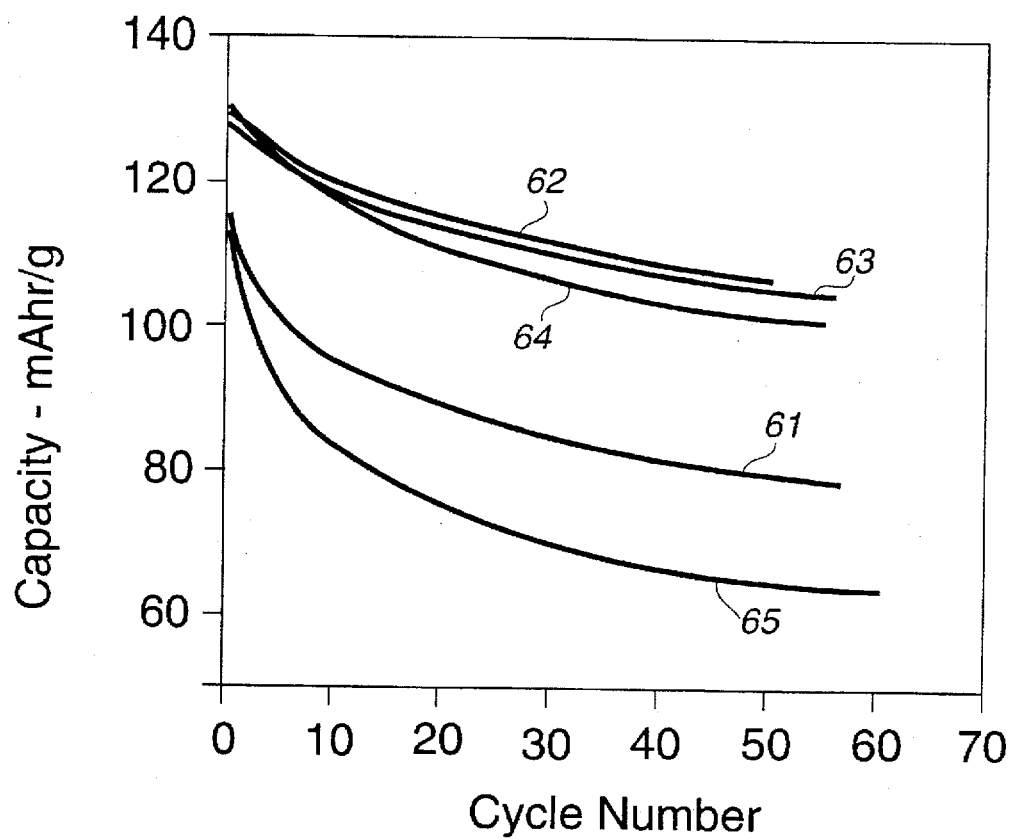
FIG. 6 is a graphic comparison of capacity and cycling stability v. number of charging cycles for cells comprising invention compounds, $Li_{1+x}M_yMn_{2-x-y}O_{4-z}F_z$, where x=0, y=0, and $z \leq 0.4$.

The series of compounds of Example 4 comprising x=0 was used to prepare battery cells which were tested in the manner described above. The results shown in FIG. 6 as traces 61–65 of increasing fluorine content indicate the effect on capacity and cycling stability of a compound favoring F in the Li:F ratio.

EXAMPLE 6

Figure 7:
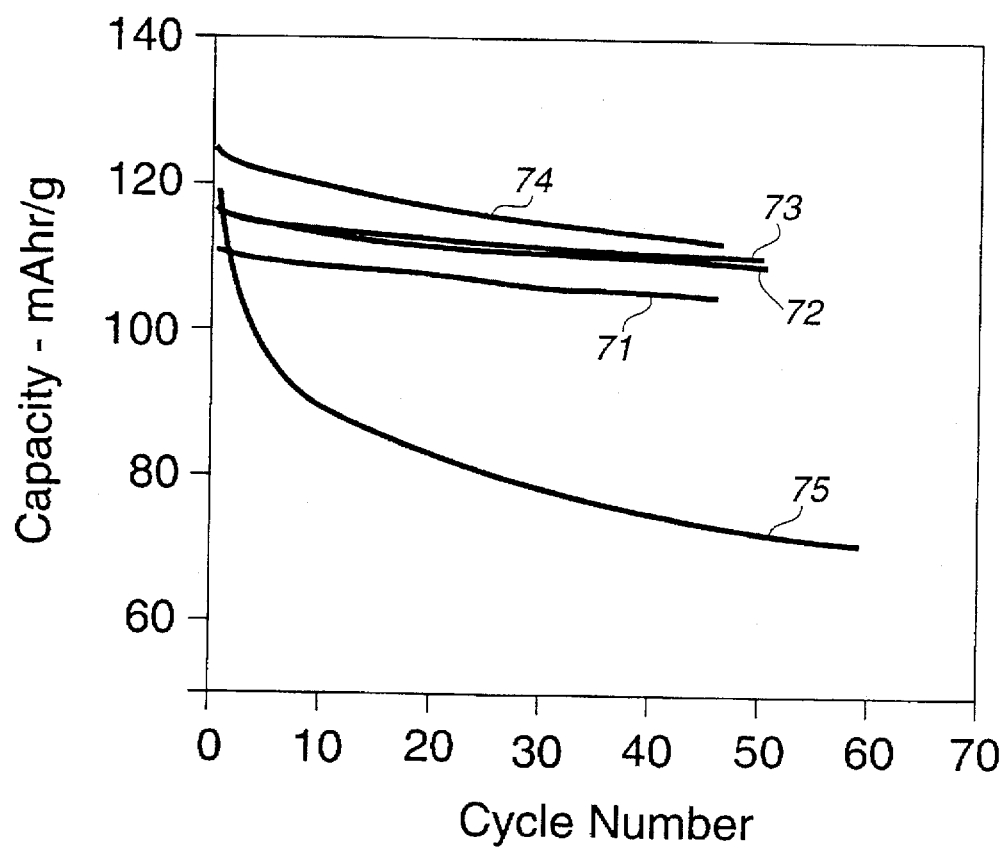
FIG. 7 is a graphic comparison of capacity and cycling stability v. number of charging cycles for cells comprising invention compounds, $Li_{1+x}M_yMn_{2-x-y}O_{4-z}F_z$, where x=0.1, y=0, and $z \leq 0.4$.

The series of compounds of Example 4 comprising x=0.1 was used to prepare battery cells which were tested in the manner described above. The results shown in FIG. 7 as traces 71–75 of increasing fluorine content indicate the improvement on capacity and cycling stability of a closer balance of F in the Li:F ratio.

EXAMPLE 7

Figure 8:
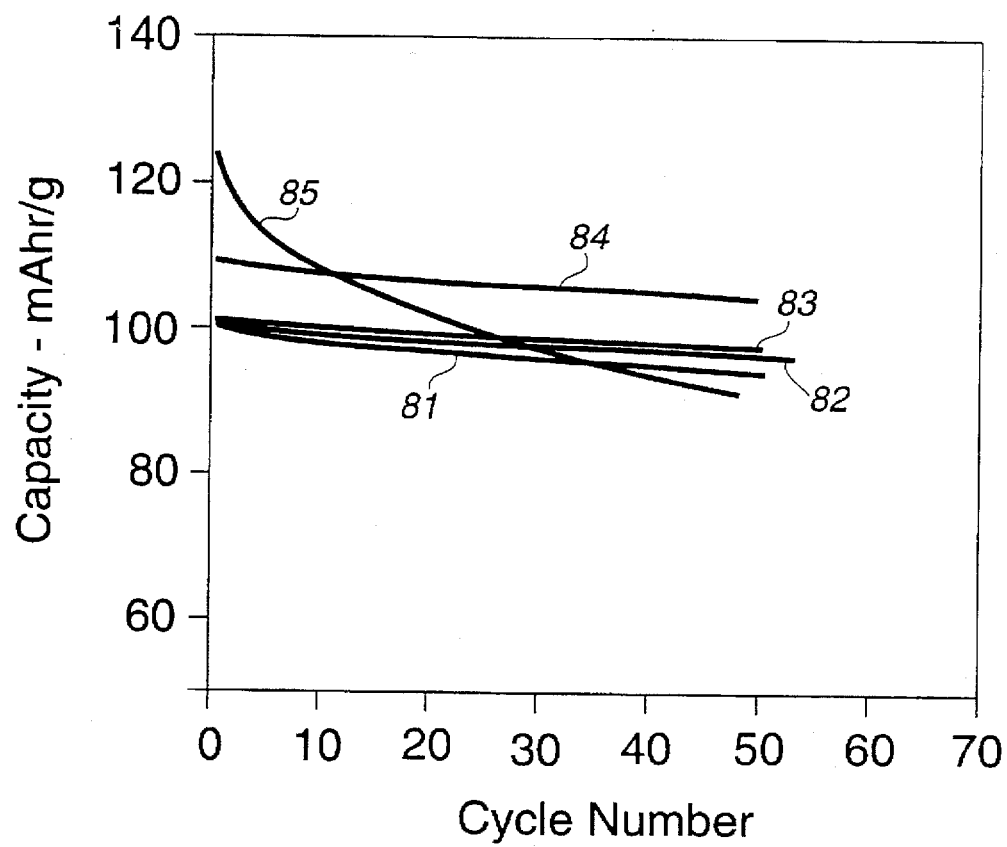
FIG. 8 is a graphic comparison of capacity and cycling stability v. number of charging cycles for cells comprising invention compounds, $Li_{1+x}M_yMn_{2-x-y}O_{4-z}F_z$, where x=0.2, y=0, and $z \leq 0.4$.

The series of compounds of Example 4 comprising x=0.2 was used to prepare battery cells which were tested in the manner described above. The results shown in FIG. 8 as traces 81–85 of increasing fluorine content indicate the further effect, particularly on cycling stability of a still closer balance of F in the Li:F ratio.

EXAMPLE 9

Figure 9:
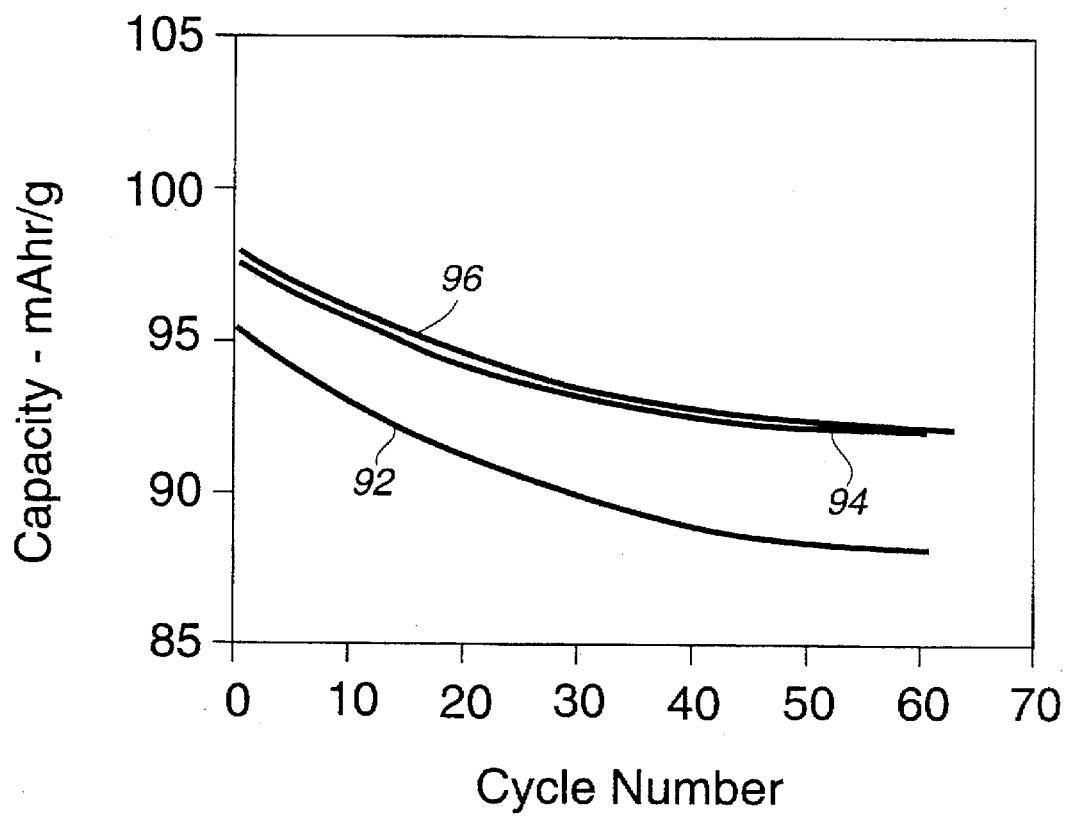
FIG. 9 is a graphic comparison of capacity and cycling stability v. number of charging cycles for cells comprising invention compounds, $Li_{1+x}M_yMn_{2-x-y}O_{4-z}F_z$, where x=0, y=0.2, and $z \leq 0.1$.

A series of compounds of the present invention with both cationic (Cr) and anionic substitutions, $Li_{1+x}M_yMn_{2-x-y}O_{4-}$ $F_z$, where x=0, y=0.2, and z=0, 0.05, and 0.1, was prepared in the above manner by combining appropriate stoichiometric amounts of precursors, for example, 10.3:2.31:1.0:0.086 weight ratio of $MnO_2$, $Li_2CO_3$, $Cr_2O_3$, and LiF ($LiCr_{0.2}Mn_{1.8}O_{3.9}F_{0.05}$). The resulting materials were used to prepare test cells whose performance improvement was comparable to the foregoing results, as shown at FIG. 9 in traces 92–96 of increasing fluorine content. Similar results may be obtained with cationic Co and Fe substitutions.

EXAMPLE 10

A series of Li-ion battery cells was prepared with the positive electrode materials of Example 6, and employing petroleum coke negative electrodes and polyvinylidene copolymer matrix electrolyte/separator elements, as described in above noted U.S. Pat. No. 5,460,904. Tests of repeated charge cycling showed cell capacities and cycling stability comparable to those of Example 6.

It is expected that other embodiments of the present invention will become apparent to the skilled artisan in light of the foregoing description, and such variations are intended to be included within the scope of this invention as recited in the appended claims.

What is claimed is:

1. A lithium manganese oxy-fluoride compound having the general formula, $Li_{1+x}M_yMn_{2-x-y}O_{4-z}F_z$, where M is a transition metal and $x \leq 0.4$, $y \leq 0.3$, and $0.05 \leq z \leq 1.0$.

2. A compound according to claim 1 where M is Co, Cr, or Fe.

3. A compound according to claim 2 where $x \leq 0.2$, y=0, and $0.05 \leq z \leq 0.4$.

4. A compound according to claim 2 where $0.1 \leq x \leq 0.2$, y=0, and $0.05 \leq z \leq 0.4$.

5. A compound according to claim 2 where $0.1 \leq x \leq 0.2$, y=0, and $0.05 \leq z \leq 0.2$.

6. A compound according to claim 2 where $0.05 \leq x \leq 0.2$, $y \leq 0.3$, and $0.05 \leq z \leq 0.2$.

7. A rechargeable battery cell comprising a positive electrode, a negative electrode, and a separator disposed therebetween characterized in that said positive electrode comprises an intercalation compound having the general formula, $Li_{1+x}M_yMn_{2-x-y}O_{4-z}F_z$, where M is a transition metal and $x \leq 0.4$, $y \leq 0.3$, and $0.05 \leq z \leq 1.0$.

8. A rechargeable battery cell according to claim 7 where M is Co, Cr, or Fe.

9. A rechargeable battery cell according to claim 8 where $x \leq 0.2$, y=0, and $0.05 \leq z \leq 0.4$.

10. A rechargeable battery cell according to claim 8 where $0.1 \leq x \leq 0.2$, y=0, and $0.05 \leq z \leq 0.4$.

11. A rechargeable battery cell according to claim 8 where $0.1 \leq x \leq 0.2$, y=0, and $0.05 \leq z \leq 0.2$.

12. A rechargeable battery cell according to claim 8 where $0.05 \leq x \leq 0.2$, $y \leq 0.3$, and $0.05 \leq z \leq 0.2$.

* * * * *